No Printed Specification Available
8813X
H. Blynn.
Fulling Hats.
Patented May 9, 1835.
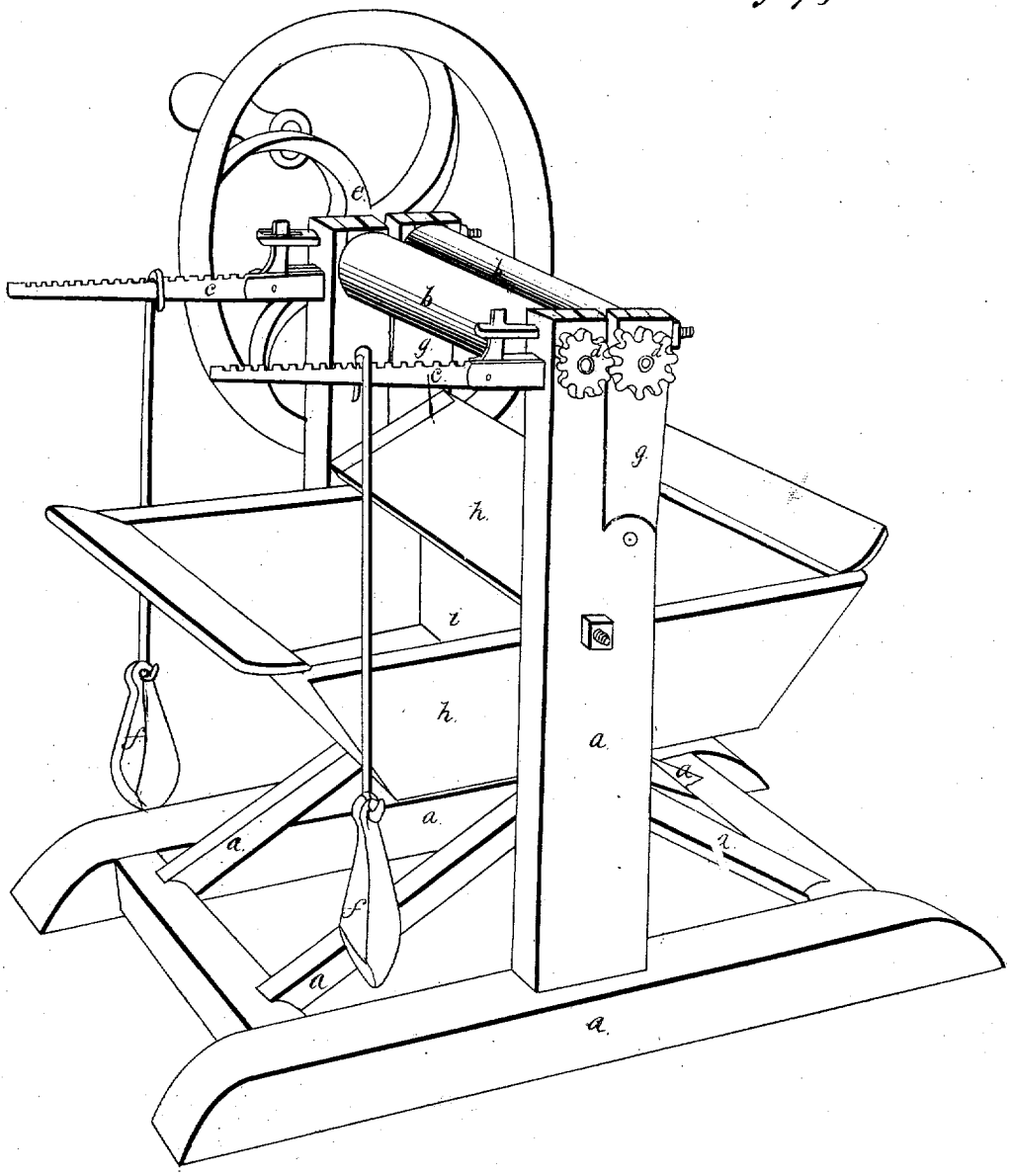
N. PETERS, PHOTO-LITHOGRAPHER, WASHINGTON, D. C.

8819X May 9. 1835 9/

Henry Blynn. May 9, 1835

The Schedule referred to in these Letters Patent and making a part of the same containing a description in the words of the said Henry Blynn himself in his improvement in a machine for stiffening hat bodies.

---

To all persons to whom these presents shall come - Henry Blynn of Newark in the County of Essex and State of New Jersey send greeting - Be it known that I the said Henry Blynn have invented a new and useful Machine, not known or used before, in the Stiffening of Hat bodies, which invention and the manner of using it is as follows. The machine consists of a frame, about four feet high with two horizontal rollers at the top, two feet three inches long and four inches in diameter running in supports attached by joints so as to admit of the rollers coming together, or receeding a little by which means they may be made to press equally on bodies of different thickness. The rollers are pressed together by means of weights resting on two bent levers one at each end of the rollers, and the force with which they are pressed together is regulated at pleasure by placing the weight nearer to or farther from the fulcrum. A tooth wheel is fitted into the end of one pivot of each roller, and the wheels being equal in size and working into each other causes the rollers to move together and prevent their slipping. On the opposite end of one of the rollers a fly wheel and handle are fixed by which the rollers are put in motion. A box or trough is placed immediately under the rollers for holding the stiffening with a partition across the middle for the purpose of having at hand, stiffening of different thickness; the one intended for the whole body of the hat and the other for the brim only, a flat board about six inches wide, is placed across the frame directly over the partition in the trough, which board turns on pivots one at each end which may thus be declined either way and made to carry the drippings into either apartment of the trough - When the machine is to be used Drawing made from the [illegible] Model [illegible]

the Hat bodies are put into that apartment of the trough containing thinner stiffening where they are completely saturated, they are then passed singly upward between the rollers, the brims are then dipped into the stiffening in the other end of the trough and again passed between the rollers which completes the process. In this way the stiffening is much more equally distributed through the hat, than it can be done in the usual way by hand and in much less time.

In witness whereof I have hereunto subscribed my name this twenty-first day of February in the year of our Lord one thousand eight hundred and thirty-five.

Witnesses
Samuel Hewlett
Stephen Dove

Henry Blynn

[illegible]

[533 wds]

41
13
123
41
533